United States Patent [19]

Newcom et al.

[11] Patent Number: 4,570,783
[45] Date of Patent: Feb. 18, 1986

[54] METHOD FOR AUTOMATIC OPERATION OF AN ACCUMULATOR

[76] Inventors: William F. Newcom, 749 Cheshan Turn, Southampton, Pa. 18966; Bartel L. Spinelli, 8 Bedford Pl., Fairlawn, N.J. 07410

[21] Appl. No.: 523,615

[22] Filed: Aug. 17, 1983

[51] Int. Cl.⁴ .............................................. B65G 1/02
[52] U.S. Cl. .................................................. 198/347
[58] Field of Search ................ 198/347, 358, 367, 447

[56] References Cited

U.S. PATENT DOCUMENTS 3,114,449  12/1963  Bruce ............................. 198/358 X
3,669,241   6/1972  Chalich .............................. 198/347
3,952,854   4/1976  Selonke et al. ..................... 198/347

FOREIGN PATENT DOCUMENTS 53-30581  3/1978  Japan .................................. 198/358

Primary Examiner—Joseph E. Valenza
Assistant Examiner—Kyle E. Shane
Attorney, Agent, or Firm—Robert J. Mooney

[57] ABSTRACT

A method is disclosed for automatic operation of an accumulator conveyor in conjunction with a main conveyor which transports odd shaped articles between two operational stations of an automated system. The method comprises the passing of articles into the entry end of the accumulator conveyor at a first speed when downstream equipment malfunctions causing articles to back-up along the main conveyor. When the back-up is dissipated, the articles stored in the accumulator conveyor are passed from the exit end of the accumulator conveyor on a first-in, first-out basis to the main conveyor at a second, faster speed while additional articles from the upstream equipment continue to enter the accumulator conveyor, also at the second speed. When all of the previously stored articles have passed back to the main conveyor, the main conveyor is operated normally with no articles passing into or out of the accumulator conveyor. Thereafter, if at least a predetermined quantity of articles remain in the accumulator conveyor the last two steps may be repeated as many times as necessary until only a relatively small quantity of articles remain in the accumulator conveyor. Use of the method advantageously allows the upstream equipment to continue to operate during the times the accumulator conveyor is being unloaded.

7 Claims, 6 Drawing Figures

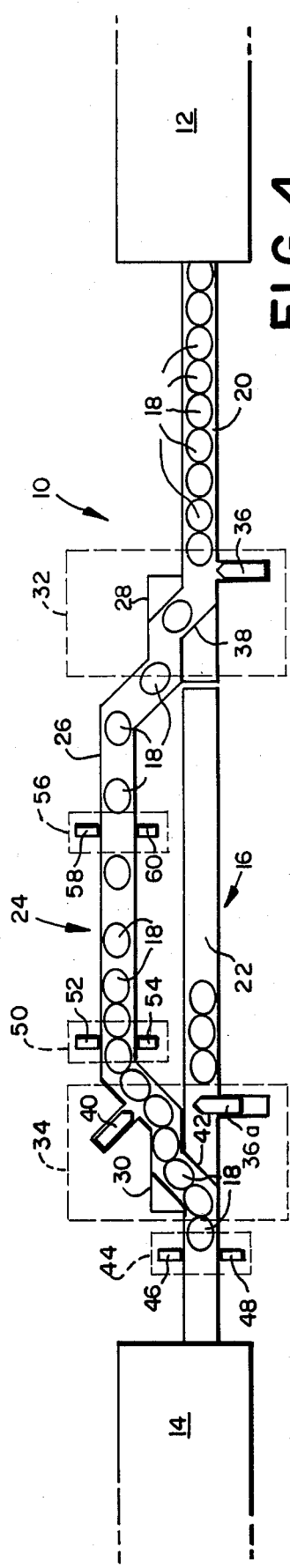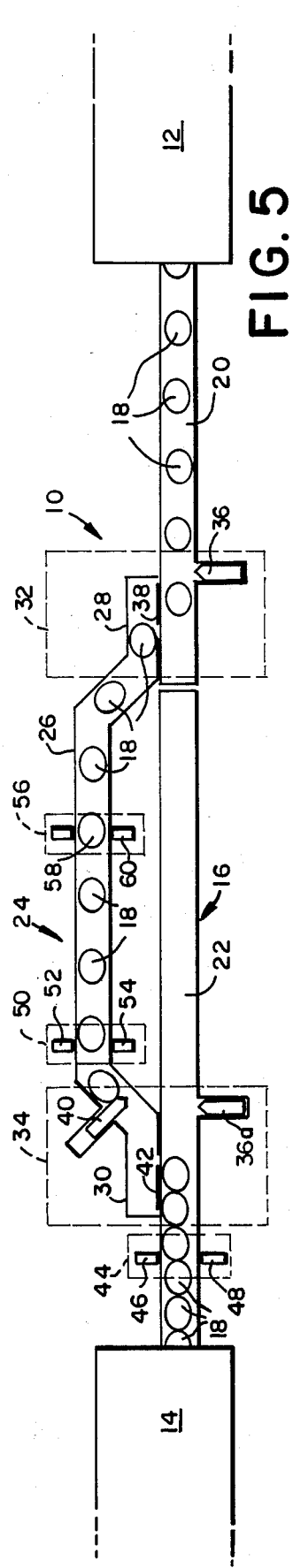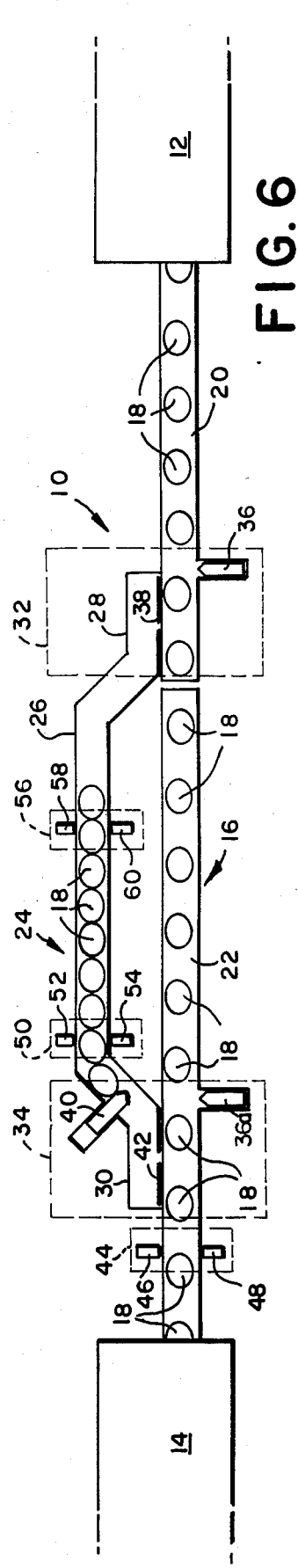

METHOD FOR AUTOMATIC OPERATION OF AN ACCUMULATOR

BACKGROUND OF THE INVENTION

The present invention relates generally to a method for accumulating odd shaped articles and, more particularly, to a method in which such articles are automatically transferred from an upstream conveyor and stored in an accumulator when a downstream main conveyor blockage or back-up occurs and in which the stored articles are automatically transferred back to the main conveyor on a first-in, first-out basis when the downstream blockage is dissipated.

In the normal operation of an automated conveyor system, such as an automated manufacturing or processing system in which containers or articles of manufacture on the line are transported or conveyed from one operational station (such as a container filling operation) to a second operational station (such as a container labelling operation), a malfunction or other such event may occur to disrupt and back-up the normal flow of articles. If the disruption is a major one the entire system may have to be shut down resulting in an expensive loss of processing time while the disruption is being remedied. In addition, the re-starting of the automated conveyor system may also be time consuming and expensive.

If the disruption is of a minor nature which can be quickly and conveniently remedied, an accumulator apparatus may be employed to receive and temporarily store the articles which would have normally been transported to the malfunctioning operational unit. In this manner the remaining, upstream components of the automated system can remain fully operation, thereby saving substantial time and expense over the less desirable alternative of shutting down and later re-starting the entire system. Once the downstream disruption has been remedied and the automated system is again functioning normally the articles which have been temporarily stored in the accumulator can thereafter continue to be processed by temporarily speeding up the downstream operational components. Alternatively, the articles could be retained in the accumulator until an upstream disruption occurs whereupon the stored articles could be employed to keep the downstream operational components operational while the upstream disruption is being remedied.

Although accumulators of the type described above have been successfully employed in connection with various automated processing and manufacturing systems, such accumulators leave much to be desired when handling odd shaped articles.

SUMMARY OF THE INVENTION

The present invention overcomes problems inherent in prior art accumulators by providing a method for automatic accumulation wherein odd shaped articles are transferred in-line from a main conveyor, stored in-line in an accumulator conveyor, and thereafter returned to the main conveyor on a first-in, first-out basis at the proper times and in proper amounts. In the method, articles are automatically passed in-line from the main conveyor (which normally transports articles from a first to a second operational station) into the entry end of the accumulator conveyor at a first predetermined speed when a downstream article back-up occurs along the main conveyor. When the downstream article back-up has dissipated, the previously accumulated and stored articles are automatically passed from the exit end of the accumulator conveyor to the main conveyor on a first-in, first-out basis at a second predetermined speed, faster than the first, while additional articles from the main conveyor are passed into the entry end of the accumulator conveyor also at the second predetermined speed. When all of the previously stored articles have passed from the accumulator conveyor to the main conveyor, the main conveyor is operated normally, at the first predetermined speed, to convey articles directly from the first to the second operational station. Thereafter, if the number of articles remaining the accumulator conveyor is greater than or equal to a predetermined quantity the last two steps may be repeated.

BRIEF DESCRIPTION OF THE DRAWINGS

The foregoing summary, as well as the following detailed description of a preferred embodiment of the invention, will be better understood when read in conjunction with the appended drawings, in which:

FIG. 4 is a schematic plan view of the system of FIG. 1 showing the dissipation of the main conveyor blockage and the articles from the accumulator conveyor being passed to the main conveyor;

FIG. 5 is a schematic plan view of the system of FIG. 1 showing the system back in the normal flow mode; and FIG. 6 is schematic plan view of the system of FIG. 1 showing the further storage of some remaining articles on the accumulator conveyor.

DESCRIPTION OF A PREFERRED EMBODIMENT

Figure 1:
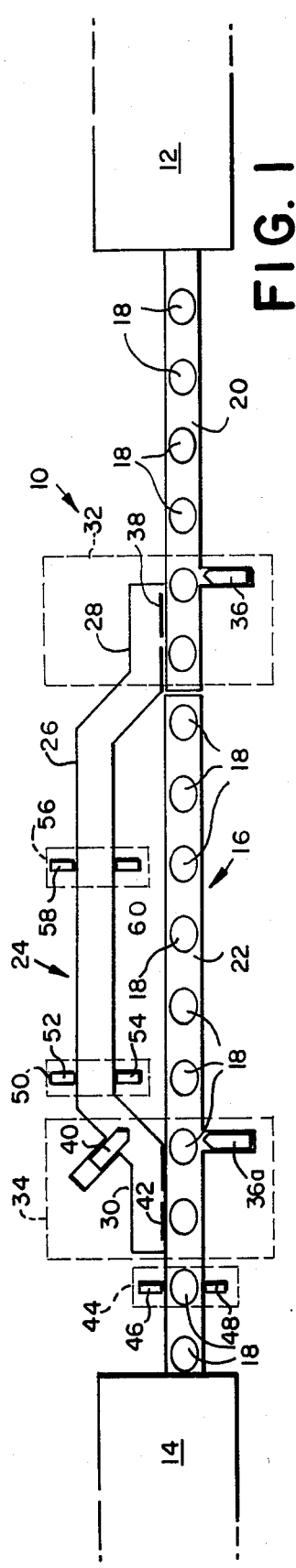
FIG. 1 is a schematic plan view of a portion of an automated odd shaped article conveyor system in the normal flow mode including an automated accumulator in accordance with the present invention.

Referring to the Figures and particularly to FIG. 1 there is shown a schematic representation of a portion of an automated conveyor system 10 which handles odd shaped articles in accordance with the present invention. For purposes of this disclosure, odd shaped article means those articles having other than a circular cross section such as, for example, articles with rectangular, square or oval cross sections. In this embodiment the automated system 10 comprises an automatic bottling system which handles odd shaped bottles. However, it should be understood that the present invention is not limited to such a bottling system and could also be adapted to any other suitable type of automated processing system such as, for example, a system for the automatic filling of odd shaped metal or plastic containers or a system for the manufacturing of a particular odd shaped product or article of manufacture.

The portion of the automated bottling system shown on FIG. 1 includes a first or upstream operational station 12, for example, an automatic bottle capping apparatus and a second or downstream operational station 14, for example, an automatic bottle labeling apparatus.

Both the bottle capping apparatus 12 and the labeling apparatus 14 comprise machinery of a type well known in the art which may be obtained commercially from various manufacturers. A detailed explanation of the structure and operation of either the bottle capping apparatus 12 or the bottle labeling apparatus 14 is not necessary for a complete understanding of the present invention and will not be provided herein. Suffice it to say that the bottle capping apparatus 12 receives a supply of filled bottles from for example, a bottle filling apparatus (not shown), properly caps the bottles (not shown) and provides a relatively continuous output flow of capped bottles at regular spaced intervals. The bottle labeling apparatus 14 receives the flow of capped bottles from the bottle capper (in a manner hereinafter described), automatically places an appropriate label on each bottle (not shown) and provides a relatively continuous output flow of regularly spaced apart, capped, and labeled bottles (not shown) which may thereafter be further processed, for example, by a boxing apparatus or other such packaging apparatus (not shown). Both the bottle capping apparatus 12 and the bottle labeling apparatus 14 are independently controlled and operated. The bottle capping apparatus 12 and the bottle labeling apparatus 14 may or may not be synchronized to operate at the exact same flow speed; that is the output flow rate of the bottles from the bottle capping apparatus 12 may or may not be the same as the requisite input flow rate for the bottle labeling apparatus 14. However, the two apparatus are operationally compatible to maximize the overall system operating efficiently.

In order to operationally link the bottle capping apparatus 12 and the bottle labeling apparatus 14, the system 10 further includes a main conveyor 16. The main conveyor 16 normally operates to receive a flow of odd shaped articles, such as Bottles 18, having an oval cross section, from the output of the bottle capping apparatus 12 and to transport or convey the received bottles 18 to the input of the bottle labeling apparatus 14. As used herein, the bottles 18 may be referred to as being either "in" or "on" the main and other conveyors. In the present embodiment, the main conveyor 16 actually comprises a first, up-stream section 20 proximate the bottle capping apparatus 12 and a second, down-stream section 22 proximate the bottle labeling apparatus 14, the two main conveyor sections 20 and 22 being positioned in end-to-end relation as shown to cooperate with each other to provide a generally continuous conveyance. Each of the main conveyor sections 20 and 22 comprise, in the present embodiment, an independently controlled, separately driven endless conveyor belt of a type well known in the art which may be obtained commercially from a variety of manufacturers. A detailed description of the structure and operation of such endless conveyor belts is not necessary for a complete understanding of the present invention.

During normal operation of the system 10 both the first and second main conveyor sections 20 and 22 are operated at the same first, predetermined speed to provide a relatively continuous flow of bottles from the output of the bottle capping apparatus 12 to the input of the bottle labeling apparatus 14 at a relatively constant flow rate. The first predetermined speed is 120 feet per minute. At a speed of 120 feet per minute the bottles 18 are delivered to the input of the bottle labeling apparatus 14 at a flow rate sufficient to permit the bottle labeling apparatus 14 to operate efficiently and yet, during normal operation, not so fast as to result in an unnecessary back-up or build-up of unlabeled bottles at input of the bottle labeling apparatus 14.

As discussed briefly above, in an automated system like the system shown in FIG. 1, incidents occasionally occur which disrupt the normal, continuous flow of the articles or bottles. Such disruptions may be caused, for example, by a jamming or equipment malfunction within the bottle labeling apparatus 14, causing the bottle labeling apparatus 14 to become inoperative. With some such equipment the bottle labeling apparatus is automatically turned off by such a malfunction while with other such equipment the apparatus must be manually turned off after the malfunction becomes apparent. In either case, once such a disruption occurs, unlabeled bottles will accumulate at the input to the bottle labeling apparatus 14 and, as shown on FIG. 2, eventually will back-up along the second mail conveyor section 22.

If the cause of the disruption is relatively serious and requires an extensive period of time to be remedied it may be necessary to shut down the entire system, resulting in an expensive loss of processing time. However, quite often such a disruption is caused by a relatively minor occurrence, such as, for example, a shortage or absence of new labels, which may be quickly and conveniently remedied. In such instances it is desirable to avoid an extensive back-up of bottles at the input of the bottle labeling apparatus 14 without having to incur the expense involved in shutting down and later restarting the entire system. Therefore, an accumulator shown generally as 24, is provided to temporarily receive the flow of bottles from the main conveyor 16 and to serve as a reservoir to temporarily store the received bottles until such time as the disruption is remedied, the back-up of bottles along the main conveyor 16 is dissipated and normal operation of the system is restored.

In the present embodiment the accumulator 24 includes an independently driven accumulator conveyor 26 comprised of an endless conveyor belt extending generally but not necessarily parallel to the main conveyor 16. The accumulator conveyor 26 is normally operated at the same first predetermined speed as the two main conveyor sections 20 and 22. The overall length of the accumulator conveyor 26 establishes its capacity for receiving and storing bottles during a system disruption. It should be understood that the present invention is not limited to the particular accumulator conveyor configuration and length as shown and described in connection with the preferred embodiment. The accumulator conveyor could be of any other configuration and/or length suitable for the particular space and operational requirements of the system within which it is employed.

First or entry end 28 of the accumulator conveyor 26 is positioned proximate and, in the present embodiment, generally parallel to the first main conveyor section 20 in order to facilitate the in-line transfer of bottles 18 from the main conveyor 16 onto the accumulator conveyor 26 in a manner hereinafter described in greater detail, the second or exit end 30 of the accumulator conveyor 26 is positioned proximate and generally parallel to the second main conveyor section 22 in order to facilitate the transfer of bottles (which have been previously collected and temporarily stored on the accumulator conveyor 26) back onto the main conveyor 16 on a first-in, first-out basis for eventual transport to the bottle labeling apparatus.

Figure 2:
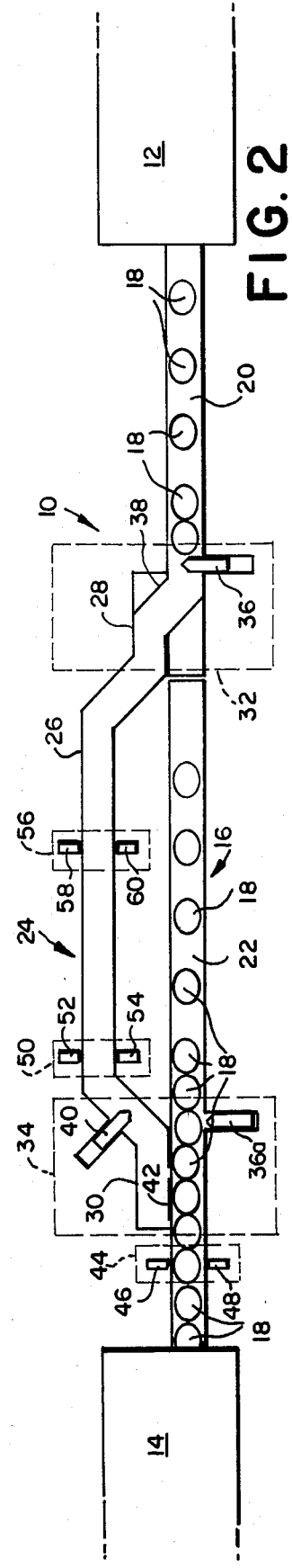
FIG. 2 is a schematic plan view of the system of FIG. 1 showing the odd shaped articles backing up along the main conveyor as a result of a downstream disruption.

The accumulator 24 further includes first and second transition means 32 and 34 proximate the accumulator conveyor entry and exit ends 28 and 30, respectively, to futher facilitate the transfer of bottles 18 between the main conveyor 16 and the accumulator conveyor 26. In the present embodiment the first or input transition means 32 comprises a first bottle blocking gate means or first gate 36 and a first pivotable diverter means 38. During normal operation of the system both the first gate 36 and the first diverter means 38 remain in their normal (open) position as shown on FIG. 1 to permit the bottles to flow continuously along the main conveyor 16. However, when a system disruption of the type described above occurs, both the first gate 36 and the first diverter means 38 are displaced to their respective closed positions to facilitate the transfer of bottles from the main conveyor 16 onto the accumulator conveyor 26. The first gate 36 is actuated to its closed position by suitable actuator means (not shown) to move transverse to the flow of the bottles 18 (as shown in FIG. 2) to momentarily block or close off the flow of bottles 18 moving along the first main conveyor section 20. While the bottle flow is blocked by the first gate 36, the first diverter means 38 is actuated by suitable actuator means (not shown) to pivot to the position as shown on FIGS. 2 and 3. Thereafter, the first gate 36 is again opened as shown on FIG. 3 to permit bottles to flow along the first main conveyor section 20. Once the bottles 18 flowing along the first main conveyor section 20 reach the first diverter means 38, they are diverted or transferred onto the accumulator conveyor 26 as shown on FIG. 3.

Figure 3:
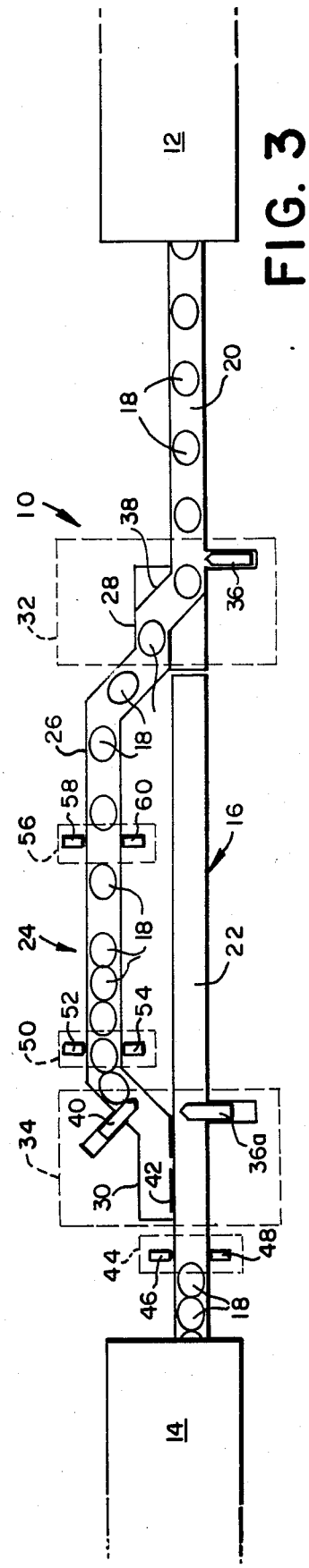
FIG. 3 is a schematic plan view of the system of FIG. 1 showing the accumulator conveyor receiving and storing articles.

Similarly, in the present embodiment, the second or exit transition means 34 comprises a second bottle blocking gate means or second gate 40 and a second pivotable diverter means 42 as well as an auxiliary gate 36a. The second gate 40 and the second diverter means 42 are normally in their closed position (as shown on FIG. 1) to permit bottles to flow along the main conveyor 16 and to prevent bottles which are collected and temporarily stored within the accumulator conveyor 26 from returning to the main conveyor 16. When a disruption occurs the first transition means 32 operates to divert bottles from the main conveyor 16 onto the accumulator conveyor 26 and a quantity of bottles will accumulate on the accumulator conveyor 26 in the vicinity of the second gate 40 as shown on FIG. 3. Thereafter, once the disruption has been remedied and the back-up of bottles 18 along the second main conveyor section 22 has been dissipated, the second diverter means 42 is activated by suitable actuator means (not shown) and is pivoted or displaced to its open position as shown on FIG. 4 and the auxiliary gate 36a is moved to its bottle blocking position, as shown in FIGS. 3 and 4, thereby preventing any bottles which may be present on the upstream side of the gate 36a from interfering with subsequent movements of the second diverter means. The second gate 40 is then actuated by actuator means (not shown) to move transverse to the accumulator conveyor 26 to its open position as shown on FIG. 4. The bottles which have been temporarily stored on the accumulator conveyor 26 may now pass through the second diverter means 42 and onto the second main conveyor section for eventual delivery to the bottle labeling apparatus 14 (as shown on FIG. 4). It should be appreciated that the present invention is not limited to the particular types of gates 36, 36a and 40 and the particular type of diverter means 38 and 42 as shown and described and that all gates are appropriately time delayed in a well known manner to prevent a gate from closing on a bottle. It will be apparent to one skilled in the art that any other suitable types of transition components could alternatively be employed.

In addition to the components thus far described, the accumulator 24 further includes a plurality of sensor means positioned at various places along the main conveyor 16 and the accumulator conveyor 26 for the purpose of detecting the presence or absence of bottle build-up and gaps between bottles in order to control the actuation of the first and second transition means 32 and 34. In the present embodiment three such sensor means are employed.

A first sensor means 44 is positioned proximate the second main conveyor section 22 at a convenient distance upstream from the bottle labeling apparatus 14. The first sensor means 44 operates to detect a build-up of bottles 18 along the second main conveyor section 22 as shown on FIG. 2 and, conversely, to detect when the bottle build-up has been dissipated as shown on FIG. 4. In the present embodiment the first sensor means 44 comprises a light source 46 on one side of the second main conveyor section 22 and an aligned light-sensitive component 48 on the other side of the second main conveyor 22. Each time the light source is blocked (i.e., each time a bottle passes by the two components) the light-sensitive component 48 generates an electrical signal. The electrical signal from the light-sensitive component 48 is supplied to electronic control circuitry (not shown) which may include a time circuit (not shown). If the light source is blocked for only a short period of time the electrical signal generated by the light-sensitive component 48 is of a relatively short duration, indicating that the bottles 18 are flowing normally along the main conveyor 16. If the light source is blocked for a longer period of time, indicating that the bottles have backed up along the main conveyor 16, the electrical signal from the light-sensitive component 48 remains constant. When the electronic control circuitry (not shown) receives such a signal it responds by generating a first set of actuator signals which are sent to the first gate 36 and the first diverter means 38 for the actuation thereof (as described above) to permit bottles to flow from the main conveyor 16 onto the accumulator conveyor 26. The position of the first sensor means 44 may be selected to permit the back-up of any desired quantity of bottles prior to the activation of the accumulator means.

Thereafter, when the disruption has been remedied and the build-up of bottles along the main conveyor 16 has dissipated, the signal from the photosensitive component 48 is extinguished and the electronic control circuitry (not shown) responds by generating a second set of actuator signals which are sent to auxiliary gate 36a causing it to move onto its bottle blocking position and to the second gate 40 and the second diverter means 42 for the actuation thereof to permit bottles to flow from the accumulator conveyor 26 to the second main conveyor section 22.

As will be discussed hereinafter in greater detail, the second set of actuation signals are also used to adjust the speed of both the second main conveyor section 22 and the accumulator conveyor 21 to a second predetermined speed. In the present embodiment the second predetermined speed is higher than the first predetermined speed, typically twenty-five percent higher than the first predetermined speed. For reasons which are apparent, the second predetermined speed is determined by the maximum operating speed of the downstream equipment, the bottle labeling apparatus 14, for example.

The second sensor means 50 is positioned proximate the accumulator conveyor 26 at a convenient distance upstream from the second gate 40. In the present embodiment, the second sensor means 50 is also comprised of a light source 52 and an aligned light-sensitive component 54 which in turn is connected to suitable electronic circuitry (not shown). However, the second sensor means 50 is employed to detect gaps in the flow of bottles 18 along the accumulator conveyor 26. Such gaps are formed as bottles from the first main conveyor section 20 (operating at, say, 120 feet per minute) are transferred onto the accumulator conveyor 26 while it is operating at, say, 150 feet per minute. The gaps between the bottles which previously had been received and stored on the accumulator conveyor 26 have now been transferred onto the second main conveyor section 22. The detection of such gaps by the second sensor means 50 results in the generation of a third set of activator signals by the electronic control circuitry which are sent to change the position of gates 36, 36a and 40 and both of the diverter means 38 and 42 to re-establish a normal flow path of bottles along the main conveyor 16 as shown on FIG. 5. The third set of actuator signals also readjust the speed of the second main conveyor section 22 back to the 120 feet per minute normal flow rate. The bottles which have already been transferred to the accumulator conveyor 26 proceed there along until they reach the closed second gate 40. Thereafter, the bottles build up behind the second gate 40 as shown on FIG. 6.

The third sensor means 56 is also positioned proximate the accumulator conveyor 26 at a predetermined distance upstream from the second sensor means 50. The third sensor means 56 is also comprised of a light source 58 and an aligned light-sensitive component 60. The third sensor means 56 is employed and operates in a manner similar to the first sensor means 44 to detect a build-up of bottles along the accumulator conveyor 26 (as shown on FIG. 6) after the disruption has been remedied and the bottles which had been previously temporarily stored on the accumulator conveyor 26 have been passed along to the main conveyor 16. Such a back-up is indicative that it is time to again remove the bottles from the accumulator conveyor 26. The position of the third sensor means may be established to detect the accumulation and storage of a predetermined quantity of bottles. Upon the detection of such a back-up along the accumulator conveyor 26, electronic control circuitry (not shown) generates a fourth set of actuator signals which are sent to gates 36, 36a and 40 and both diverter means 38 and 42 to again change the positions thereof to permit bottles to flow from the first main conveyor section 20 into the accumulator conveyor 26 and to simultaneously permit the bottles which have built up on the accumulator conveyor to flow onto the second main conveyor section 22 as shown on FIG. 4. The fourth actuator signals also readjust the speed of the second main conveyor section 22 to the 150 feet per minute rate. The speed of the accumulator conveyor 26 remains at the 150 feet per minute rate.

OPERATION

In operation, as long as no downstream malfunctions occur, bottles 18 from the bottle capping apparatus 12 are normally carried or transported by the main conveyor 16, operating at 120 feet per minute, to the bottle labeling apparatus 14. The operation of the two apparatuses may be coordinated with the main conveyor 16 to provide for efficient usage of the entire system with little or no bottle build-up at the input to the bottle labeling apparatus 14.

If a minor malfunction occurs downstream, either at the bottle labeling apparatus 14 or beyond, which is sufficient to cause a disruption, bottles will build up behind the bottle labeling apparatus 14 as shown on FIG. 2. Once the selected quantity of bottles has built up along the main conveyor 16 to block or activate the first sensor means 44, the first actuator signals are generated to displace the first gate 36 to temporarily halt the flow of bottles along the first main conveyor section 20 as shown on FIG. 2. The first diverter means 38 is thereafter displaced to the open position as shown on FIGS. 2 and 3 and the first gate 36 is again opened, permitting bottles to flow at the 120 feet per minute rate along the first main conveyor section 20 and onto the accumulator conveyor 26 as shown on FIG. 3. Thereafter, as long as the downstream disruption continues, all of the bottles from the bottle capping apparatus 12 are diverted in-line onto the accumulator conveyor 26 for temporary storage. Alternately, means (not shown) may be employed to shut down the system when the accumulator conveyor 26 is completely filled and/or the accumulator conveyor 26 backs up along the main conveyor 16 to the bottle capping apparatus 12.

Once the downstream disruption has been remedied or otherwise corrected, the bottles which have built up along the second main conveyor section 22 are passed along to the bottle labeling apparatus 14. Thereafter, the dissipation of the bottle build-up is detected by the first sensor means 44 and the second actuator signals are generated. The second actuator signals cause auxiliary gate 36a to move to its bottle blocking position (as shown in FIGS. 3 and 4) and cause the second diverter means 42 to displace to its open position and the second gate 40 to open (as shown on FIG. 4) to permit the bottles which have been previously stored on the accumulator conveyor 26 to pass onto the second main conveyor section 22 on a first-in, first-out basis.

At this stage both the accumulator conveyor 26 and the second main accumulator section 22 are operating at the higher 150 feet per minute rate in order to transport the stored bottles from the accumulator conveyor 26 to the bottle labeling apparatus 14 at a rapid rate. The bottle labeling apparatus 14 must also be operating at the higher rate. The first main conveyor section continues to operate at the 120 feet per minute rate. The first diverter means 38 remains in the open position as shown on FIG. 4 so additional bottles from the first main conveyor section 20 continue to pass serially onto the accumulator conveyor 26. However, since the accumulator conveyor 26 is now operating at the higher speed, e.g., 150 feet per minute, the distance or gaps between the received bottles are greater than the normal bottle spacing established by the bottle capping apparatus (as shown on FIG. 4).

Once all of the bottles that had been previously stored on the accumulator conveyor 26 have been transferred onto the second main conveyor section 22, the second sensor means 50 detects the greater width gaps between the bottles on the accumulator conveyor 26 and the third actuator signals are generated. As described above, the third actuator signals cause Gate 36a to open and cause gates 36 and 40 to close to block the flow of bottles and to thereafter cause both of the diverter means 38 and 42 to displace to their closed positions as shown on FIG. 5. The second main conveyor section 22 is again adjusted to operate at the lower 120 feet per minute rate. Thereafter, the first gate 36 is again opened and the bottles from the bottle capping apparatus 12 again flow at the normal 120 feet per minute rate along the main conveyor 16 to the bottle labeling apparatus 14 as shown on FIG. 6.

The bottles which remain on the accumulator conveyor 26 are blocked by the closed second gate 40 and, as shown on FIG. 6, a bottle build-up again occurs on the accumulator conveyor 26. If the bottle build-up is long enough (i.e. contains enough bottles) to extend upstream to the third sensor means 56, the third sensor means detects the build-up and the fourth actuator signals are generated. As described above, the fourth actuator signals cause the auxiliary gate 36a to close and cause the first gate 36 to momentarily close to block the bottle flow and to permit the first diverter means 38 to displace to its open position as shown on FIG. 2. Thereafter the first gate 36 is again opened to permit additional bottles to again pass from the first main conveyor section 20 onto the accumulator conveyor 26. Simultaneously, the second diverter means 42 is displaced to its open position and the second gate 40 is opened to permit the built-up, previously stored bottles from the accumulator conveyor 26 to pass onto the second main conveyor section 22 as shown on FIG. 4. Again, the speed of the second main conveyor section 22 is adjusted to the higher, 150 feet per minute rate for rapid removal of the built-up bottles from the accumulator conveyor 26. When all of the built-up, previously stored bottles have been removed from the accumulator conveyor 26, the second sensor means again detects the greater width gaps between bottles and the third actuator signals are again generated. As described in detail above, the third actuator signals cause auxiliary gate 36a to open and cause gates 36 and 40 and both diverter means 38 and 42 to change positions to restore the normal operating condition as shown on FIGS. 5 and 6. Again the speed of the second main conveyor section 22 is adjusted to the 120 feet per minute rate.

If the additional bottles which now remain in the accumulator conveyor 26 are sufficient in quantity to cause a build-up which extends upstream to the third sensor means 56 the last two steps will be recycled or repeated again and again, with the number of bottles remaining being reduced each time. Eventually, the number of bottles remaining on the accumulator conveyor 26 will be relatively small and the recycling will cease, leaving these bottles to remain on the accumulator until the next downstream disruption occurs. If and when a subsequent disruption occurs the accumulator conveyor 26 is again brought into play and the process continues as described above.

From the foregoing description of a preferred embodiment and from the accompanying drawings, it can be seen that the present invention comprises a method for providing an automated accumulator for employment in an automated processing or manufacturing system. It will be recognized by those skilled in the art that changes or modifications could be made to the embodiment as shown and described without departing from the broad inventive concepts of the invention. It is understood, therefore, that this invention is not limited to the particular embodiment as shown and described, but it is intended to cover all changes and modifications which are within the scope and spirit of the invention as set forth in the appended claims.

We claim:

1. A method for the automatic transfer of articles between a main conveyor, which normally transports articles seriatim at a first predetermined speed from a first operational station to a second operational station, and an accumulator conveyor means, having an entry end proximate the main conveyor and an exit end proximate the main conveyor at a location downstream from the entry end, the method comprising the steps of:
    a. diverting articles seriatim from the main conveyor into the entry end of the accumulator conveyor means at the first predetermined speed when a downstream article back-up occurs along the main conveyor;
    b. storing up to a predetermined quantity of the diverted articles seriatim in the accumulator conveyor means during the downstream article back-up;
    c. when the downstream back-up has dissipated, returning the stored articles from the exit end of the accumulator conveyor means on a first-in, first-out basis to the main conveyor at a second, more rapid, predetermined speed while at the same time, diverting additional articles from the main conveyor into the entry end of the accumulator conveyor means at the second predetermined speed; and
    d. resuming the normal transport of articles along the main conveyor at the first predetermined speed with no articles passing to or from the accumulator conveyor means once the previously stored articles have passed from the accumulator conveyor means to the main conveyor.

2. The method as recited in claim 1 wherein step c further comprises:
    returning the stored articles from the exit end of the accumulator conveyor means to the main conveyor at the second predetermined speed while diverting additional articles from the main conveyor into the entry end of the accumulator conveyor means at the second predetermined speed only if the number of stored articles is greater than or equal to the predetermined quantity.

3. The method as recited in claim 2 wherein steps c and d are repeated until the number of previously stored articles in the accumulator conveyor means is less than the predetermined quantity.

4. The method as recited in claim 3 and further including the step of sensing the downstream condition of the main conveyor at least during steps a and c to determine when an article back-up occurs and when an article back-up has been dissipated.

5. The method as recited in claim 4 and further including the step of sensing the spacing between the articles on the accumulator conveyor means at least prior to step d to determine when the previously accumulated and stored articles have passed from the accumulator conveyor means to the main conveyor.

6. The method as recited in claim 5 and further including the step of sensing a back-up of articles at a predetermined location along the accumulator conveyor means at least prior to step c.

7. The method as recited in claim 6 and further including the steps of actuating transition means proximate the entry end of the accumulator conveyor means prior to steps a and d; and actuating transition means proximate to the exit end of the accumulator conveyor means prior to steps c and d.

* * * * *